(12) United States Patent
Altman et al.

(10) Patent No.: US 7,496,494 B2
(45) Date of Patent: Feb. 24, 2009

(54) METHOD AND SYSTEM FOR MULTIPROCESSOR EMULATION ON A MULTIPROCESSOR HOST SYSTEM

(75) Inventors: Erik Richter Altman, Danbury, CT (US); Ravi Nair, Briarcliff Manor, NY (US); John Kevin O'Brien, South Salem, NY (US); Kathryn Mary O'Brien, South Salem, NY (US); Peter Howland Oden, Ossining, NY (US); Daniel Arthur Prener, Croton-on-Hudson, NY (US); Sumedh Wasudeo Sathaye, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 10/244,414

(22) Filed: Sep. 17, 2002

(65) Prior Publication Data

US 2004/0054517 A1    Mar. 18, 2004

(51) Int. Cl.
*G06F 9/455* (2006.01)
(52) U.S. Cl. .......................... 703/26; 703/23
(58) Field of Classification Search ............... 703/20, 703/23, 26; 718/104
See application file for complete search history.

(56) References Cited

U.S. PATENT DOCUMENTS

| | | | |
|---|---|---|---|
| 4,564,903 A | 1/1986 | Guyette et al. |
| 5,440,710 A | 8/1995 | Richter et al. |
| 5,481,684 A | 1/1996 | Richter et al. |
| 5,574,878 A | 11/1996 | Onodera et al. |
| 5,574,922 A | 11/1996 | James |
| 5,619,665 A | 4/1997 | Emma |
| 5,668,969 A | 9/1997 | Fitch |
| 5,675,762 A | 10/1997 | Bodin et al. |
| 5,678,032 A | 10/1997 | Woods et al. |
| 5,751,982 A | 5/1998 | Morley |
| 5,768,593 A | 6/1998 | Walters et al. |
| 5,832,205 A | 11/1998 | Kelly et al. |
| 5,905,998 A | 5/1999 | Ebrahim et al. |
| 5,983,012 A | 11/1999 | Bianchi et al. |

(Continued)

FOREIGN PATENT DOCUMENTS

JP    59-167756    9/1984

(Continued)

OTHER PUBLICATIONS

"Java Multithreading" David Nelson-Gal et.al., Jun. 1,1998, Java Developer's Journal, pp. 1-4, http://jdj.sys-con.com/read/35997.htm.*

(Continued)

*Primary Examiner*—Hugh Jones
(74) *Attorney, Agent, or Firm*—Brian P. Verminski, Esq.; McGinn IP Law Group, PLLC

(57) ABSTRACT

A method (and system) for executing a multiprocessor program written for a target instruction set architecture on a host computing system having a plurality of processors designed to process instructions of a second instruction set architecture, includes representing each portion of the program designed to run on a processor of the target computing system as one or more program threads to be executed on the host computing system.

2 Claims, 9 Drawing Sheets

U.S. PATENT DOCUMENTS

| | | | |
|---|---|---|---|
| 6,031,992 | A | 2/2000 | Cmelik et al. |
| 6,075,937 | A | 6/2000 | Scalzi et al. |
| 6,075,938 | A | 6/2000 | Bugnion et al. |
| 6,091,897 | A | 7/2000 | Yates et al. |
| 6,134,515 | A | 10/2000 | Skogby |
| 6,158,049 | A | 12/2000 | Goodwin et al. |
| 6,189,141 | B1 | 2/2001 | Benitez et al. |
| 6,289,369 | B1 * | 9/2001 | Sundaresan ............... 718/103 |
| 6,289,419 | B1 | 9/2001 | Takahashi |
| 6,339,752 | B1 | 1/2002 | Mann et al. |
| 6,341,371 | B1 | 1/2002 | Tandri |
| 6,351,844 | B1 | 2/2002 | Bala |
| 6,381,682 | B2 | 4/2002 | Noel et al. |
| 6,430,657 | B1 | 8/2002 | Mittal et al. |
| 6,463,582 | B1 | 10/2002 | Lethin et al. |
| 6,480,845 | B1 * | 11/2002 | Egolf et al. ................. 707/6 |
| 6,539,464 | B1 * | 3/2003 | Getov ....................... 711/170 |
| 6,728,950 | B2 | 4/2004 | Davis et al. |
| 6,738,974 | B1 * | 5/2004 | Nageswaran et al. ....... 718/104 |
| 6,763,328 | B1 * | 7/2004 | Egolf et al. ................. 703/27 |
| 6,763,452 | B1 | 7/2004 | Hohensee et al. |
| 6,915,513 | B2 * | 7/2005 | Duesterwald et al. ...... 717/168 |
| 6,961,806 | B1 | 11/2005 | Agesen et al. |
| 2002/0066086 | A1 | 5/2002 | Linden |
| 2002/0104075 | A1 | 8/2002 | Bala et al. |
| 2002/0147969 | A1 | 10/2002 | Lethin et al. |
| 2002/0199172 | A1 | 12/2002 | Bunnell |
| 2003/0093780 | A1 | 5/2003 | Freudenberger et al. |
| 2003/0171907 | A1 | 9/2003 | Gal-On et al. |

FOREIGN PATENT DOCUMENTS

| | | |
|---|---|---|
| JP | 62-163149 | 7/1987 |
| JP | 63-226740 | 9/1988 |
| JP | 07-271738 | 10/1995 |
| JP | 08-234981 | 9/1996 |
| JP | 08-272686 | 10/1996 |
| JP | 10-312298 | 11/1998 |
| JP | 2000-207233 | 7/2000 |
| JP | 2000-242512 | 9/2000 |
| WO | WO 95/16967 | 6/1995 |
| WO | WO 99/44131 | 9/1999 |

OTHER PUBLICATIONS

Lai et al.; Load balancing in distributed shared memory systems; IPCCC 1997., IEEE International; pp. 152-158.*

Liang et al.; An effective selection policy for load balancing in software DSM; Parallel Processing, 2000. Proceedings. 2000 International Conference on; Aug. 2000 pp. 105-112.*

Bala, V., et al., "Dynamo: A Transparent Dynamic Optimization System", *Conference on Programming Language Design and Implementation*, 2000, pp. 1-12.

Burke, M.G., et al., "The Jalapeno Dynamic Optimizing Compiler for JavaTM", *IBM Thomas J. Watson Research Center Technical Paper*, Mar. 1999, 13 pages (published 1999 ACM Java Grande Conference Proceedings, San Francisco, CA, Jun. 12-14,1999).

Ball, T., et al., "Efficient Path Profiling", *IEEE Proceedings of MICRO-29*, Dec. 2-4, 1996, pp. 1-12.

"Computer Dictionary", Third Edition, Microsoft Press, 1997, excerpts including p. 467.

IBM, "Low-Synchronization Translation Lookaside Buffer Consistency Algorithm" (ID NB9011428), IBM Technical Disclosure Bulletin, Nov. 1990 vol. 33 Issue 6B p. 428-433.

Hoogerbrugge et al., "Pipelined Java Virtual Machine Interpreters", 2000 (15 pages).

University of Queensland, "The University of Queensland Binary Translator (UQBT) Framework", 2001, 326 page (34 pages extracted). Online version can be obtained at <www.experimentalstuff.com/Technologies/uqbt/uqbt.pdf>.

Julian Brown, "ARMphetamine—A Dynamically Recompiling ARM Emulator", May 2000, 97 pages (36 pages extracted). Online version can be obtained at <http://armphetamine.sourceforge.net/diss.ps>.

"A framework for remote dynamic program optimization", M. J. Voss and R. Eigenmann, Proceedings of the ACM SIGPLAN workshop on Dynamic and adaptive compilation and optimization table of contents pp. 32-40, 2000, pp. 32-40, ISBN: 1-58113-241-7.

"Using Annotation to Reduce Dynamic Optimiation Time", C. Krintz and B. Calder, 2001 ACM ISBN-158113-414-2/01/06, pp. 156-167.

"Prototype real-Time monitor: Design" R. Van Scoy et al., Technical Report CMU/SEI-87-TR-038 ESD-TR-87-201, Nov. 1987.

Magnusson, P.S., "A Design for Efficient Simulation of a Multiprocessor", Proceedings of the First International Workshop on Modeling, Analysis, and simulation of Computer and Telecommunication Systems (MASCOTS), La Jolla, Ca Jan. 1993, pp. 3 69-78.

Lamport, L., "How to Make a Multiprocessor Computer that Correctly Executes Multiprocess Programs", IEEE Transactions on Computers, C-28 Sep. 9, 1979, pp. 690-691.

Adve, S., et al., "Shared Memory Consistency Models: A Tutorial", IEEE Computer, vol. 29, No. 12, Dec. 1996, pp. 66-76.

Herrod, S.A., "Using Complete Machine Simulation to Understand Computer System Behavior", Ph.D. Thesis, Stanford University, Feb. 1998.

Nichols, B., et al., "Pthreads Programming: A POSIX Standard for Better Multiprocessing" (O'Reilly Nutshell), Sep. 1996.

May, C., "Mimic: A Fast System/370 Simulator", Proceedings of the Object Oriented Programming Systems Languages and Applications Conference (OOPSLA), Orlando, FL, Oct. 4-8, 1987, Special Issue of Sigplan Notices, Dec. 1987, vol. 22, No. 7, Jun. 24.

Turley, J., "Alpha Run x86 Code with FX!32", Microprocessor Report, Mar. 5,1996.

Wikipedia entries and revision histories of "Memory coherence", Consistency model, "Weak consistency", "Emulator", "Virtual machines", and Simulation, http://en.wikipedia.org. accessed Feb. 21, 2007, 21 pages., date of publication not provided.

Department of Defense, "DoD" Modeling and Simnulation (M&S) Glossary, Jan. 1998, 175 pages.

* cited by examiner

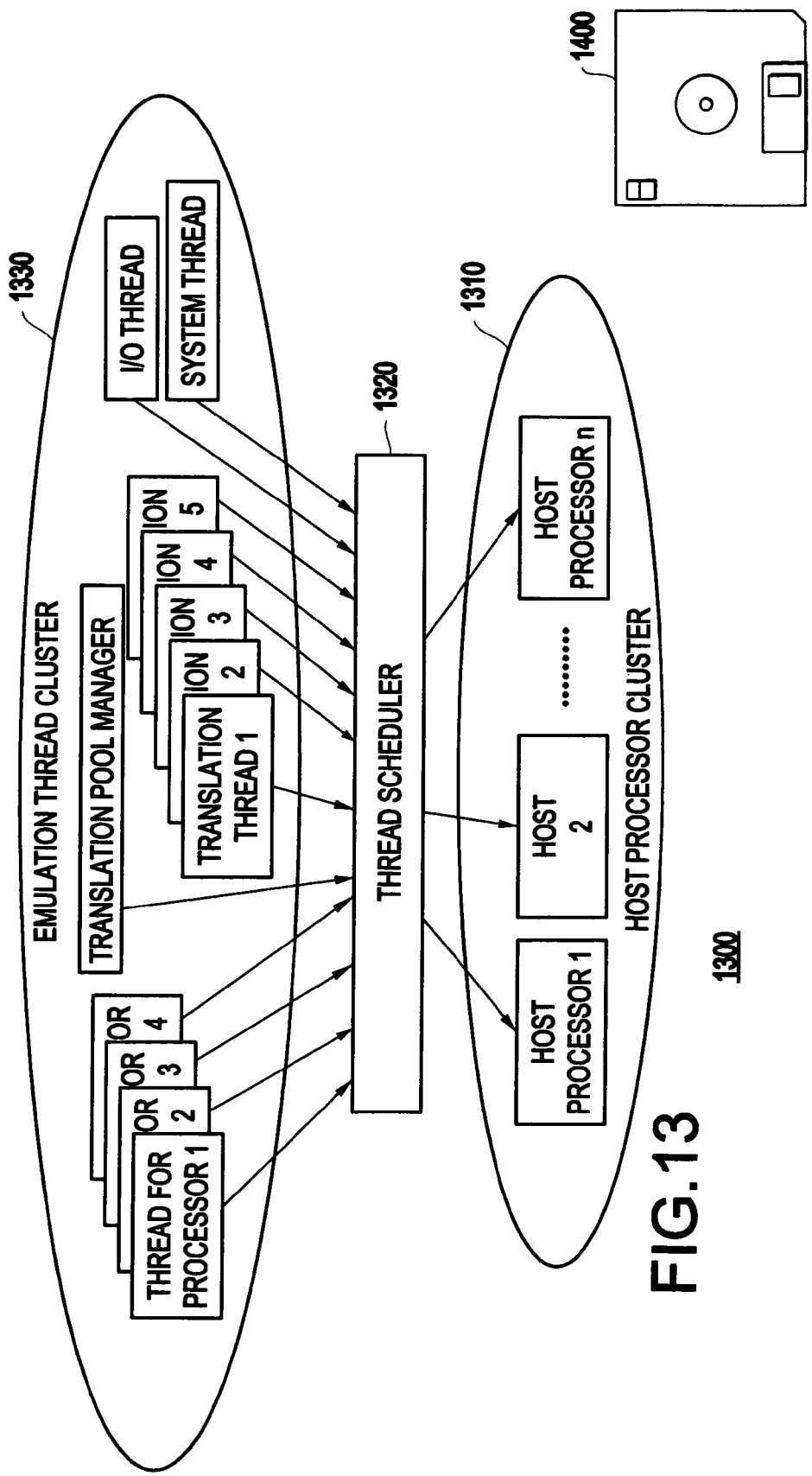

METHOD AND SYSTEM FOR MULTIPROCESSOR EMULATION ON A MULTIPROCESSOR HOST SYSTEM

CROSS-REFERENCE TO RELATED APPLICATION

The present application is related to U.S. patent application Ser. No. 10/244,434, filed Sep. 17, 2002, to Nair et al., entitled "METHOD AND SYSTEM FOR EFFICIENT EMULATION OF MULTIPROCESSOR MEMORY CONSISTENCY", to U.S. patent application Ser. No. 10/244,682, filed on Sep 17, 2002, to Nair et al., entitled "HYBRID MECHANISM FOR MORE EFFICIENT EMULATION AND METHOD THEREFOR", and to U.S. patent application Ser. No. 10/244,559, filed on Sep. 17, 2002, to Nair et al., entitled "METHOD AND SYSTEM FOR EFFICIENT EMULATION OF MULTIPROCESSOR ADDRESS TRANSLATION ON A MULTIPROCESSOR HOST", and to U.S. patent application Ser. No. 10/244,564, filed on Sep. 17, 2002, to Nair et al., entitled "METHOD AND SYSTEM FOR TRANSPARENT DYNAMIC OPTIMIZATION IN A MULTIPROCESSING ENVIRONMENT", each assigned to the present assignee, and incorporated herein by reference.

BACKGROUND OF THE INVENTION

1. Field of the Invention

The present invention generally relates to computer systems, and more particularly to a method (and system) for reproducing the behavior of a multiprocessing computer system on another multiprocessing computing system.

2. Description of the Related Art

The need for emulating the behavior of one computer system on another has long been recognized. Several schemes have been proposed for doing this. A summary of these techniques appears in U.S. Pat. No. 5,832,205, incorporated herein by reference.

The solution of U.S. Pat. No. 5,832,205 includes a combined hardware/software scheme to perform the emulation of the instruction set of one processor on another. This scheme allows the hardware design to incorporate features that facilitate the execution of the target instruction set. For the same reason, however, this cannot emulate all systems equally efficiently.

SimOS (e.g., see Stephen A. Herrod, "Using Complete Machine Simulation to Understand Computer System Behavior," Ph.D. Thesis, Stanford University, Feb. 1998), incorporated herein by reference, and SimICS (e.g., see Peter S. Magnusson, "A Design For Efficient Simulation of a Multiprocessor," Proceedings of the First International Workshop on Modeling, Analysis, and Simulation of Computer and Telecommunication Systems (MASCOTS), La Jolla, Calif., January 1993, pp. 69-78) are examples of systems that can emulate without special hardware features. However, their performance is not as effective as that of U.S. Pat. No. 5,832,205.

In general, these systems employ various levels of translation. Techniques have been described (e.g., see Jim Turley, "Alpha Runs x86 Code with FX!32", Mar. 5, 1996, Microprocessor Report) where the extent of translation is varied according to the extent of execution of the code.

However, computer systems today comprise more than one processor (e.g., a multiprocessor system as opposed to a uniprocessor system). The emulation of these multiprocessor systems has not been adequately addressed in the conventional techniques.

Additionally, besides the emulation of the multiple processors in such a system, additional aspects that need to be emulated are the various forms of communication between the processors, as well as the rules governing the order of access to memory locations by the multiple processors.

Both SimOS and SimICS attempt to emulate the behavior of multiprocessor systems. However they do not use multiprocessor systems as a host computing system.

Thus, conventional techniques have not addressed the problems of emulation of multiprocessors in multiprocessor systems.

That is, the conventional techniques (and the instruction set architecture) very often have been limited to (and refer to) a single processor systems being emulated, whereas most systems today are multiprocessor systems, especially the large systems (e.g., beyond the realm of the personal computer (PC)). Hence, techniques which have been used to emulate one processor by another processor simply will not work in a multiprocessor system environment. That is, the conventional emulation techniques designed for uniprocessor systems are impossible to perform when multiple processors are present.

SUMMARY OF THE INVENTION

In view of the foregoing and other problems, drawbacks, and disadvantages of the conventional methods and structures, an object of the present invention is to provide a method and structure in which a multiprocessing system is enabled using some processor instruction set and memory architecture to efficiently emulate the behavior of another multiprocessing system using some other processor instruction.

In a first aspect of the present invention, a method (and system) for executing a program written for a target instruction set architecture on a host computing system having a plurality of processors designed to process instructions of a second instruction set architecture, includes representing each portion of the program designed to run on a processor of the target computing system as one or more program threads to be executed on the host computing system.

In a second aspect of the invention, a system (and method) includes means for mapping hardware resources of a target system into software threads, means for mapping threads to hardware resources of the host system, means for mapping state information of the target system into the memory of the host system, and means for improving performance of emulation by partitioning emulation tasks into larger number of threads.

In a third aspect of the present invention, a thread processing structure for a host computer of a multiprocessor system, includes a thread pool for holding threads, a thread processor for accessing a memory of the host system, and for determining which thread in the thread pool to select for emulation, a thread creator for creating new threads and placing said new threads in the thread pool, and a thread scheduler for scheduling the threads held in the thread pool, the scheduler scanning waiting threads and allocating a next thread in priority order to an available processor.

In a fourth aspect of the present invention, a signal-bearing medium tangibly embodying a program of machine-readable instructions executable by a digital processing apparatus to perform a method of executing a program written for a target instruction set architecture on a host computing system having a plurality of processors designed to process instructions of a second instruction set architecture, the method including representing each portion of the program designed to run on a processor of the target computing system as one or more program threads to be executed on the host computing system.

With the unique and unobvious aspects of the present invention, emulation of systems having many processors can be performed efficiently. Further, the invention uses a host computer for the emulation.

Additionally, a key feature of the invention is that the invention gets away from the notion that the guest system is a piece of hardware. Instead, the invention treats the guest system as a piece of software.

Hence, the guest is treated more abstractly as having a multiple parallel threads which need to be executed, and then the threads are mapped into the hardware resources of the host. This essentially eliminates the intermediate step of normally mapping the parallelism in the program into the hardware of the guest, and then the hardware of the guest would be emulated by the hardware in the host. The invention eliminates this intermediate step of even knowing that there might actually have even been hardware in the guest which would have mapped to the hardware in the host.

Thus, the invention eliminates a step of mapping software threads of an application of the guest to hardware in the guest. Thereafter, each of these threads of the guest is scheduled for execution onto one or more processors of the host.

Another advantage of the invention is that it is easier to build and debug such a system because it eliminates the need to worry about getting the details of the hardware of the guest machine correct.

BRIEF DESCRIPTION OF THE DRAWINGS

The foregoing and other purposes, aspects and advantages will be better understood from the following detailed description of a preferred embodiment of the invention with reference to the drawings, in which:

FIG. 13 shows a system 1300 which is an enhancement of FIG. 9 to accommodate additional translation threads; and FIG. 14 illustrates a signal bearing medium 1400 (e.g., storage medium) for storing steps of a program according to the present invention.

DETAILED DESCRIPTION OF PREFERRED EMBODIMENTS OF THE INVENTION

Figure 1:
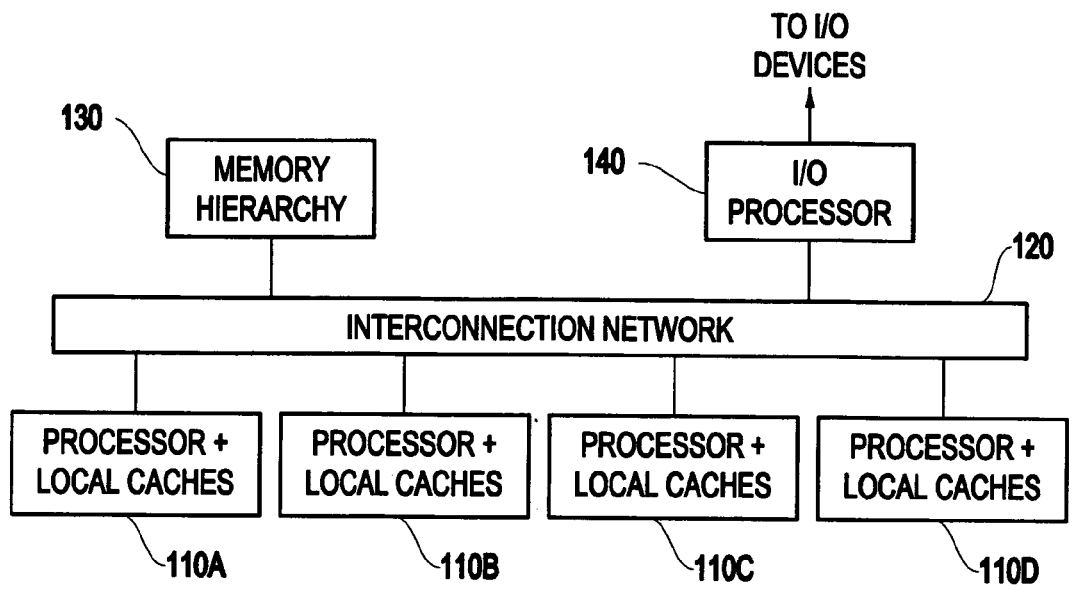
FIG. 1 shows a target multiprocessor computing system 100, including multiple processing elements, a memory subsystem, a coherent bus interconnection, and an input/output (I/O) processor.

Referring now to the drawings, and more particularly to FIGS. 1-14, there are shown preferred embodiments of the method and structures according to the present invention.

Preferred Embodiment

FIG. 1 shows a generic multiprocessing system 100 for being emulated. It includes a plurality of processors 110A-110D, each possibly with its own local caches connected through some interconnection network 120 to a memory hierarchy 130 that may include additional levels of cache backed up by a main memory (not shown). The system also has access to I/O devices including disks and communication networks through an I/O processor 140, which formats incoming requests from the system into a form understandable by the devices. Obviously, the system is not limited to the four processors, etc. shown, but indeed any number of processors, etc. may be employed.

Each processor 110A-110D in FIG. 1 can be viewed as if it were executing instructions which affect the state of the system 100. The effect of each instruction is classified as shown in the scheme 200 of FIG. 2.

For example, an instruction may be broadly classified as a "local resource instruction" or a "shared resource instruction" depending on whether it affects resources local to the processor executing it, or whether it affects resources that are shared among all processors. Examples of local resources are general purpose registers, floating point registers, processor status register, and control registers local to each processor. Shared resources may include memory and I/O devices.

Shared resources must be emulated with particular care because multiple processors may attempt to access these in a given period of time. It is important that the order of access of the shared resource in the emulated system be such that the same order could possibly have occurred in the system being emulated.

In order to manage this efficiently, the shared resource instructions are further classified as (a) "exclusive instructions", meaning that they access shared resources that are used exclusively by the executing processor, (b) "shared read instructions", meaning that the shared resources used by the instruction are only read from and not changed, and (c) "communicating instructions", which include all other shared resource instructions. Communicating instructions are so named because they typically are used to communicate information from one processor to another, for example by one processor writing a value which one or more other processors read.

Figure 3:
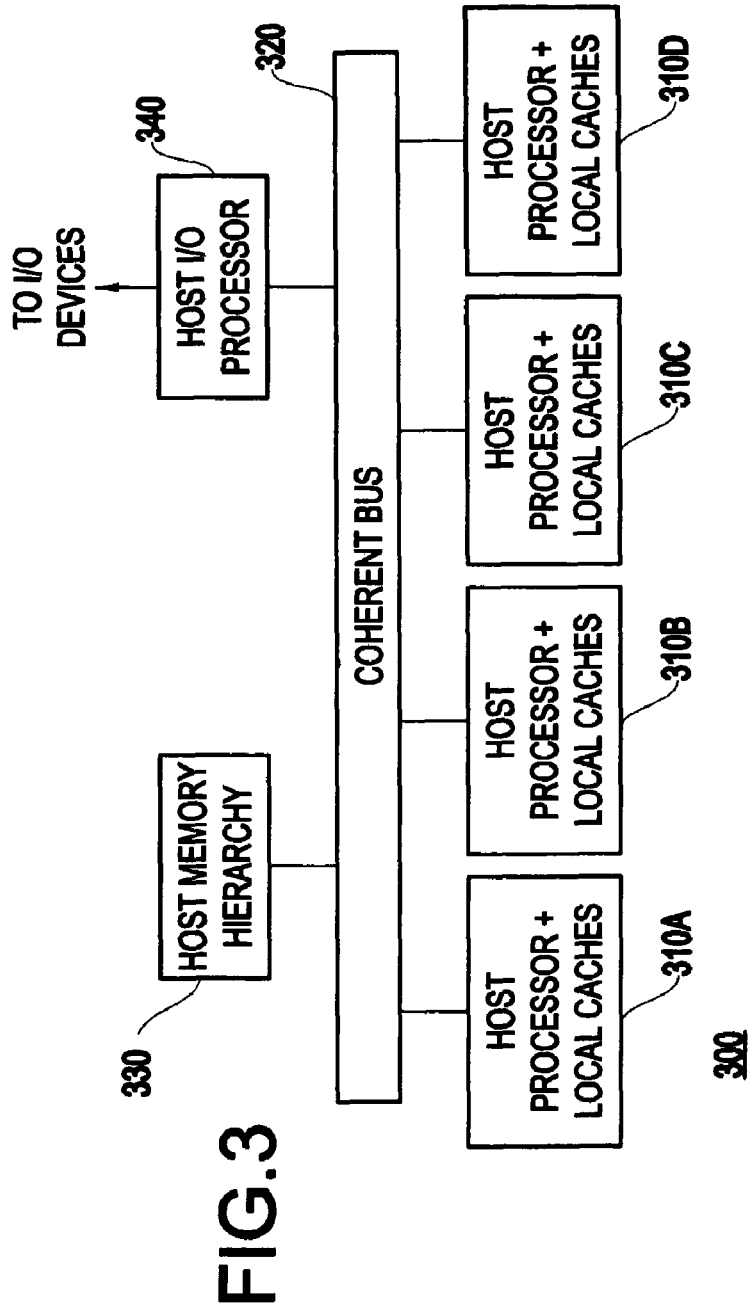
FIG. 3 shows a host multiprocessor computing system 300, including multiple host processing elements, a host memory subsystem, a coherent host bus interconnection, and a host I/O processor.

FIG. 3 is a diagram showing a host system 300 on which the emulation is desired. It is similar in physical structure to the target system 100 of FIG. 1, although some of the details may differ.

For example, the instruction set of the host processor may be different from the instruction set of the target processor. The number of processors 310A-310D and memory size may also be different. The interconnection network 330 to access the shared resources may be different both in form and function. The host system will be assumed to be configured in an SMP (symmetric multiprocessing) configuration. One implication of this is that all processors 310A-310D in the host will access the same memory and have reasonably similar delay in accessing memory locations. Also shown is the Host I/O Processor 340 which is similar to processor 140 shown in FIG. 1.

The state of each resource in the target system is modeled by allocating a region of the memory of the host system 300. It is assumed here that the emulation is being performed under a shared virtual memory operating system environment. This provides a host memory size that can accommodate all real resources of the target system.

Figure 4:
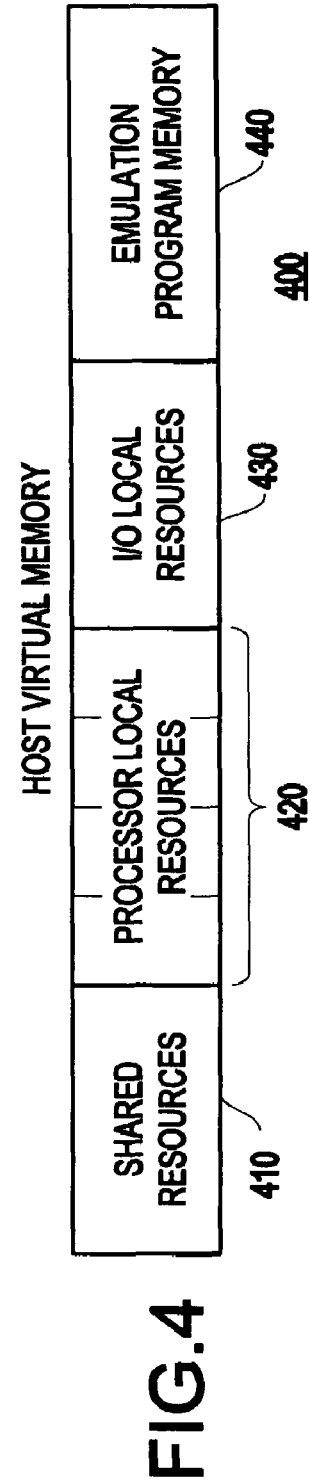
FIG. 4 shows a mapping 400 of various resources in the target system 100 into the memory of the host system 300.

FIG. 4 shows a breakdown of a virtual memory (VM) 400 of the host 300, emulating various resources of the target system 100. The VM 400 includes shared resources 410 (e.g., target real memory), processor local resources 420 (e.g., general purpose registers, floating point registers, program counter, control registers, etc.), I/O local resources, and emulation program memory.

It is noted that a 64-bit virtual addressing host can comfortably accommodate tens or even hundreds of gigabytes of real memory and the local resources of hundreds of processors, and still have enough addressing available for the emulation program itself.

Besides a shared-memory SMP, the existence of support will be assumed for multiple threads in the operating system. An example of such support is the p-threads package under the Unix® operating system (e.g., see Bradford Nichols et al., "Pthreads Programming: A POSIX Standard for Better Multiprocessing," (O'Reilly Nutshell), September 1996. Such a package allows the creation in software of multiple program streams that execute in parallel, while also allowing safe sharing of variables between the streams. In addition, these packages typically also provide means to spawn new threads, "kill" (terminate) threads, and interrupt or wake up threads.

It is noted that the systems shown in FIGS. 1-4 exist and the invention can be exemplarily implemented thereon. Indeed, an aim of the invention is to implement the invention without necessarily changing the physical hardware (e.g., putting in any hardware modification) in the host system, in order to perform the emulation according to the present invention.

Figure 5:
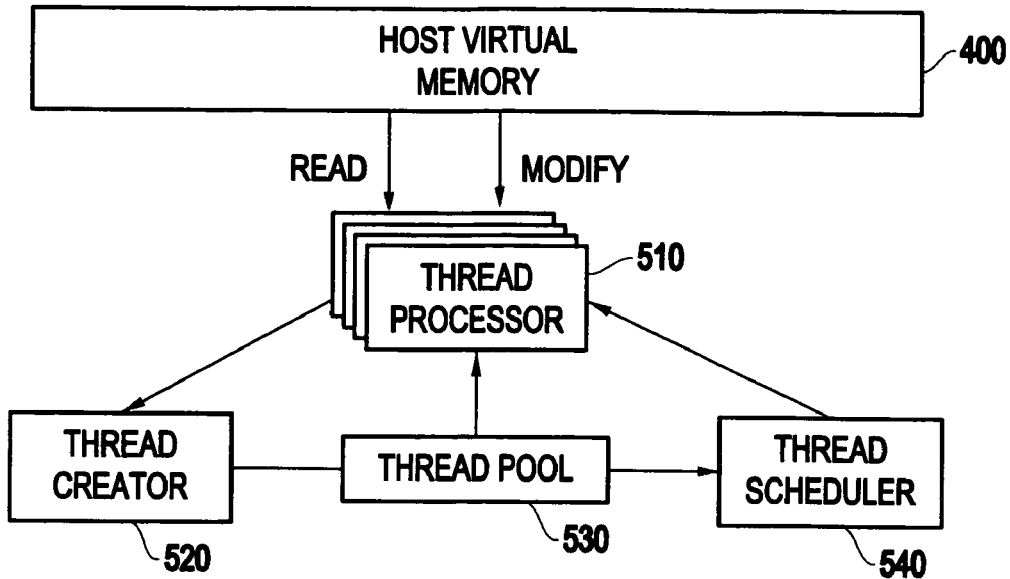
FIG. 5 shows a thread processing software structure 500 on the host system 300.

FIG. 5 shows a thread processing system 500 according to the present invention. The System 500 include a thread processer 510, a thread creator 520, a thread 530, and a thread scheduler 540.

As shown in FIG. 5, the thread processor (engine) 510 decides which thread in the thread pool 530 to select for emulation, and thereby processes (schedules) the threads held in the thread pool 530.

In the operation of processing the threads, sometimes the thread processor determines that some new threads must be created. Thus, threads are created by the thread creator 520, and are placed in the thread pool 530. Waiting threads are scanned by the thread scheduler 540 which allocates the next thread in priority order to an available processor.

The execution of a thread in a processor involves reading some locations in host virtual memory 400 and modifying these or other locations. Thus, the thread processor interacts with the host virtual memory 400 to map the memory of the guest system also into the memory of the host. The only thing available to the thread processor is the host virtual memory, and thus such a mapping occurs.

It is noted that, if the model of FIG. 5 was not available, then what would occur in the conventional system would be to decide beforehand what threads exist (e.g., assume that each of the host processors are one thread) and then perform a one-to-one mapping with what is available on the host. As noted above, this technique has many problems.

Hence, the invention uses the inventive thread processor 500 to determine what threads need to be created and scheduled.

Assuming a large pool 530 of threads, the effectiveness of the system increases as the number of processors available to process these threads increases. The effectiveness, however, may be limited by the number of instructions that are of the communicating type as defined in FIG. 2.

Figure 2:
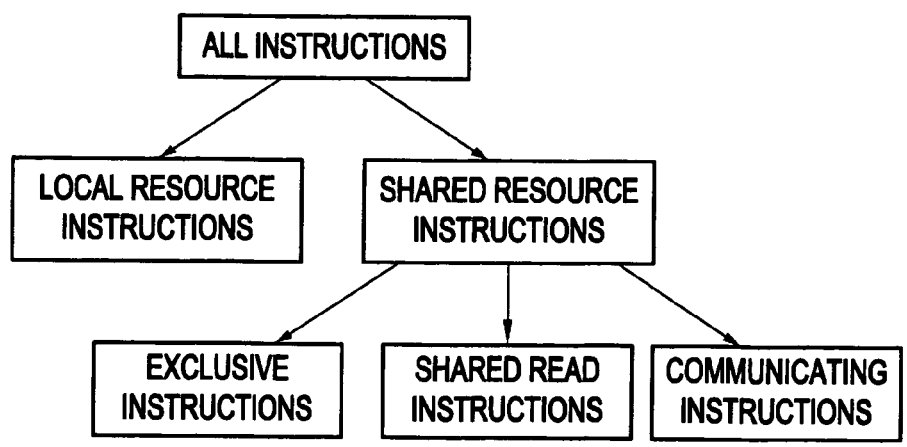
FIG. 2 shows a scheme 200 for categorization of various instructions performed on the system 100 of FIG. 1.

Even though the entire real memory of the target system is shared, it is often possible to divide the memory further into three categories corresponding to the three subclasses of shared resource instructions shown in FIG. 2.

These regions are (a) "exclusive access regions", (b) "read-only regions", and (c) "other shared regions". Exclusive access regions are those which are accessed only by a single thread. Read-only regions may be accessed by multiple threads, but are never modified. Hence, it is permissible to replicate these regions and include a copy as part of the local exclusive region of the thread.

The other shared regions should be treated differently. That is, if copies are made, for example, for efficient local access, it is important that changes made by one thread be communicated correctly to all other threads that may be accessing the same region or that may access the region in the future.

Figure 6:
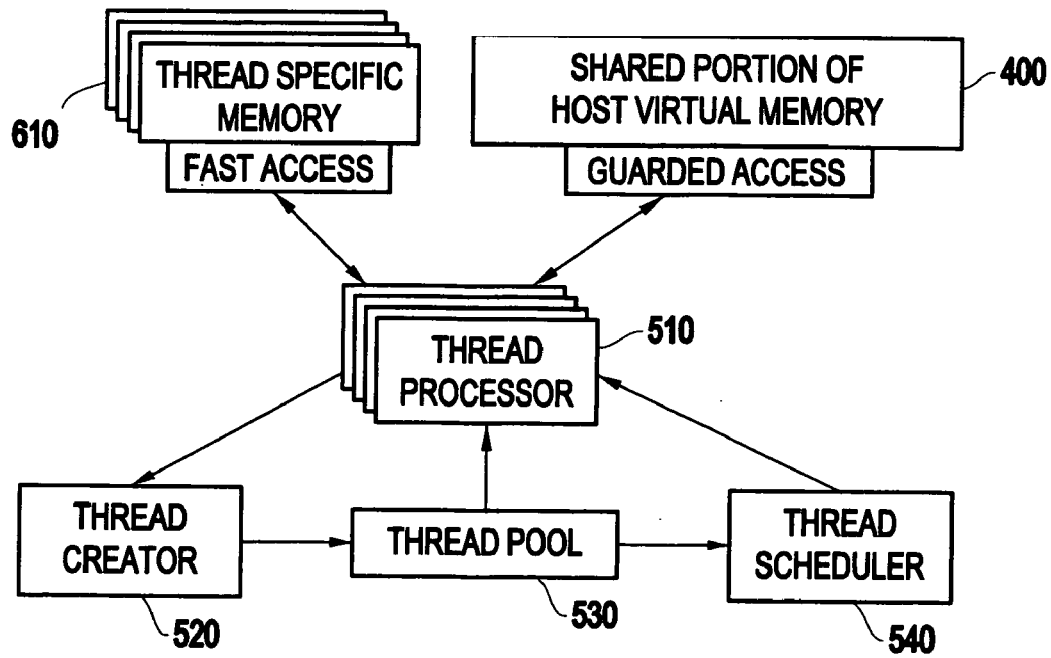
FIG. 6 shows a system in which memory access can be made faster using thread-specific memory.

FIG. 6 shows how memory access can be made faster using thread-specific memory 610. That is, the thread processor 510 can access the thread specific (local) memory for a fast access, whereas the shared portion of the host virtual memory is accessed in a guarded access.

Hence, for efficiency, the memory can be divided out into a plurality (e.g., two) of portions. The first portion is where communication is minimal and the second portion is a portion where there is a lot of communication between the threads themselves.

Thus, if portions of memory are dedicated to each of the threads, then these portions can be made into a fast access memory, whereas threads which need to "talk" to each other (e.g., which need to be shared) and may not require fast access (e.g., since their privileges must be checked whether such accesses are allowed or not, etc.) can be formed into a shared portion of the host virtual memory. Hence, by separating the memory into two portions, a faster overall access speed of the memory can be achieved.

Figure 7:
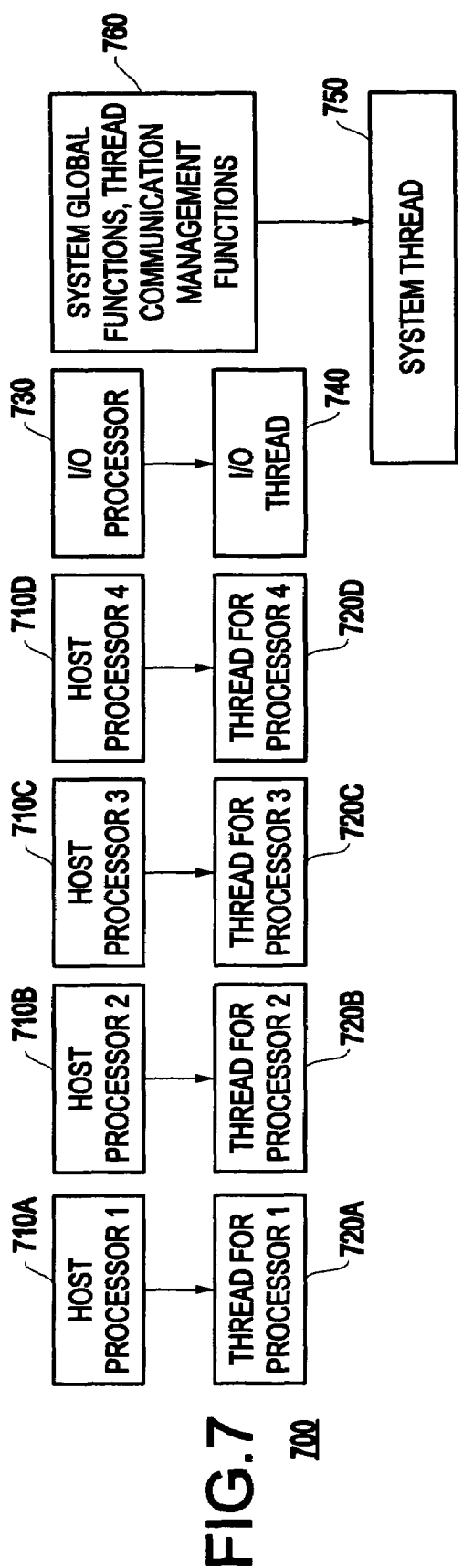
FIG. 7 shows a system 700 for simple mapping of functions of the target system into threads of the host system.

FIG. 7 shows a straightforward mapping 700 of the tasks (functions) of emulating a target multiprocessing system into threads of the host system.

Each processor 710A, 710B, 710C, 710D, etc. along with its resources is emulated, respectively, as a thread 720A, 720B, 720C, 710D, etc. Also shown are the I/O processor 730 and the I/O thread 740. As is evident, the present invention does not require that the processing be just that associated with processors in the traditional sense, but also covers I/O processors, channels for the IBM 390® system, coprocessors in some systems, etc.

Additionally, a system thread 750 is provided which includes all functions 760 of the target system that are not processor-specific, and also all functions of the emulation system itself, including the tasks of handling the creation of threads, communication between threads, debugging and performance monitoring aspects, etc.

It is noted that the concept of FIG. 7 could be performed on a single processor, in which a single processor processes the threads from the host. That is, using a single processor, the concept can be thought of as a multiprogramming system in which continuous switching occurs between the various threads on a single processor. The emulation system itself sits under the shared-memory SMP operating system containing the threads package mentioned earlier.

Figure 8:
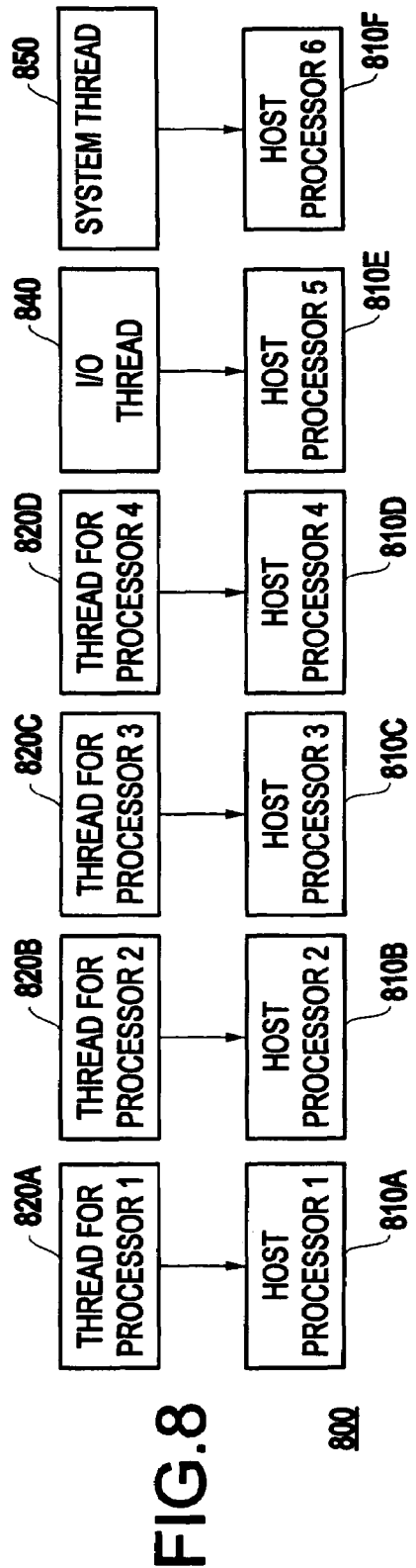
FIG. 8 shows a system 800 for trivial mapping of the threads of FIG. 7 to processors in a multiprocessing host system.

FIG. 8 shows a multiprocessor system in which the threads package may be written to map each thread 820A, 820B, 820C, 820D, etc. to one of the host processors 810A, 810B, 810C, 810D, etc. (in contrast to the single processor scenario mentioned above). Further shown are the I/O thread 840 being mapped to host processor 810E and a system thread 850 being mapped to host processor 810F.

The advantage with the approach of FIG. 8 is that the physical communication between the emulating host processors is limited to that which occurs between the threads themselves. Since the threads are mapped closely to the structure of the emulated target system, the communication behavior of the host is similar to the communication behavior of the target system.

However, one disadvantage with this approach in FIG. 8 (e.g., which suggests a one-to-one relationship between the threads and the host processors) is the potential underutilization of the host system. That is, in a system in which each host processor is respectively dedicated to a single thread, if one of the emulated target processors is idle, then the corresponding host processor is also not well utilized.

Another disadvantage is the scalability of the technique. If the host system has many more processors than the target system, then many of the additional processors cannot be adequately utilized. Conversely, if the host system has fewer processors, then the one-to-one mapping of threads to processors can be accommodated only if multiple target processors are mapped to the same thread.

Figure 9:
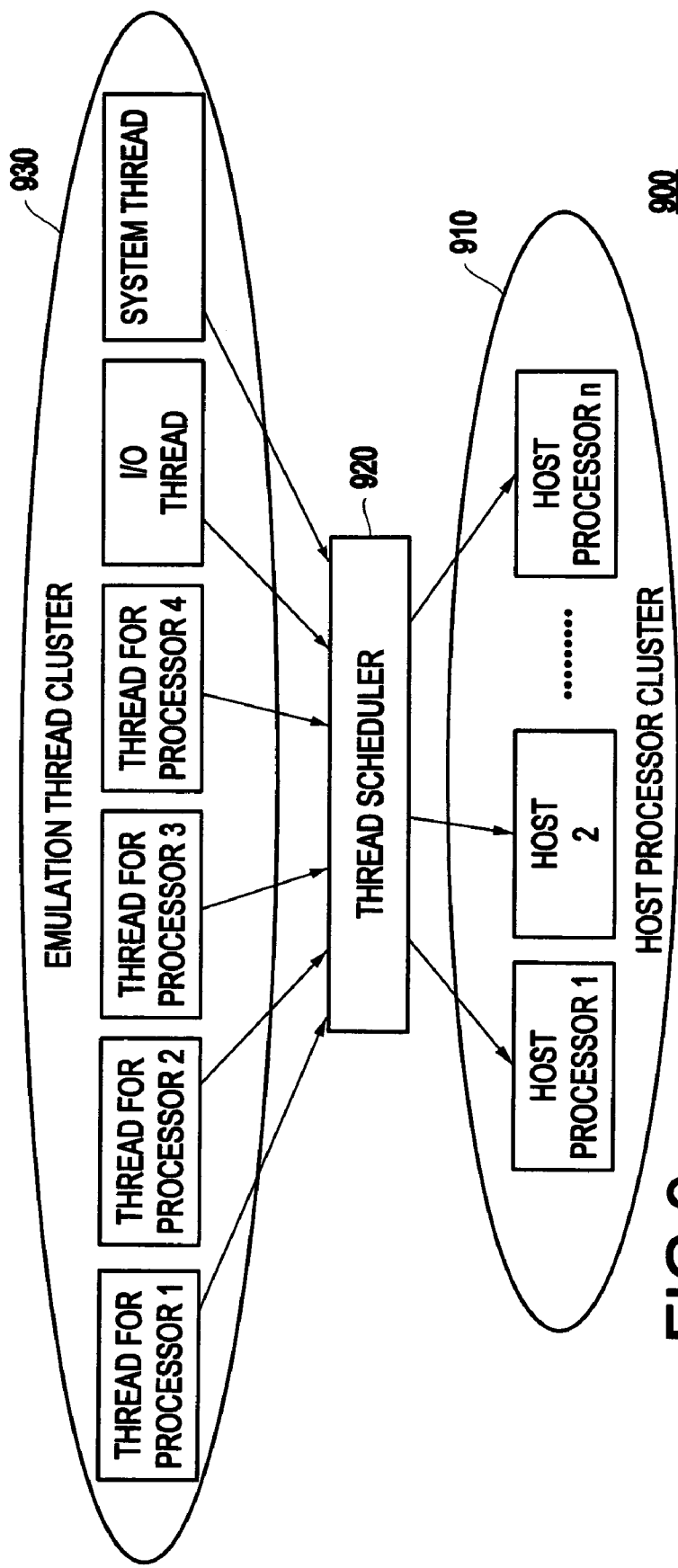
FIG. 9 shows a system 900 for more efficient mapping of the threads of FIG. 7 to processors in a multiprocessing host system.

FIG. 9 shows a system 900 which provides a solution to avoid some of the above-mentioned problems, and includes a host processor cluster 910, a thread scheduler 920, and an emulation thread cluster 930. As discussed below, greater efficiency results because the system of FIG. 9 acts to balance the loads of the host processors. Indeed, there may be some periods where some processors are completely idle and some are completely overloaded. The system of FIG. 9 including the thread scheduler 920 serves to smooth out the load. More specifically, the thread scheduler 920 determines which thread to put where (e.g., which host processor) and when, in order to optimize the load balance.

Thus, as mentioned earlier, the advantage of dynamic thread mapping over a static mapping is greater when the number of threads gets larger. Hence, it is possible to restructure an emulation system to provide more parallel threads rather than the one-thread-per-processor scheme shown in FIG. 7.

Figure 10:
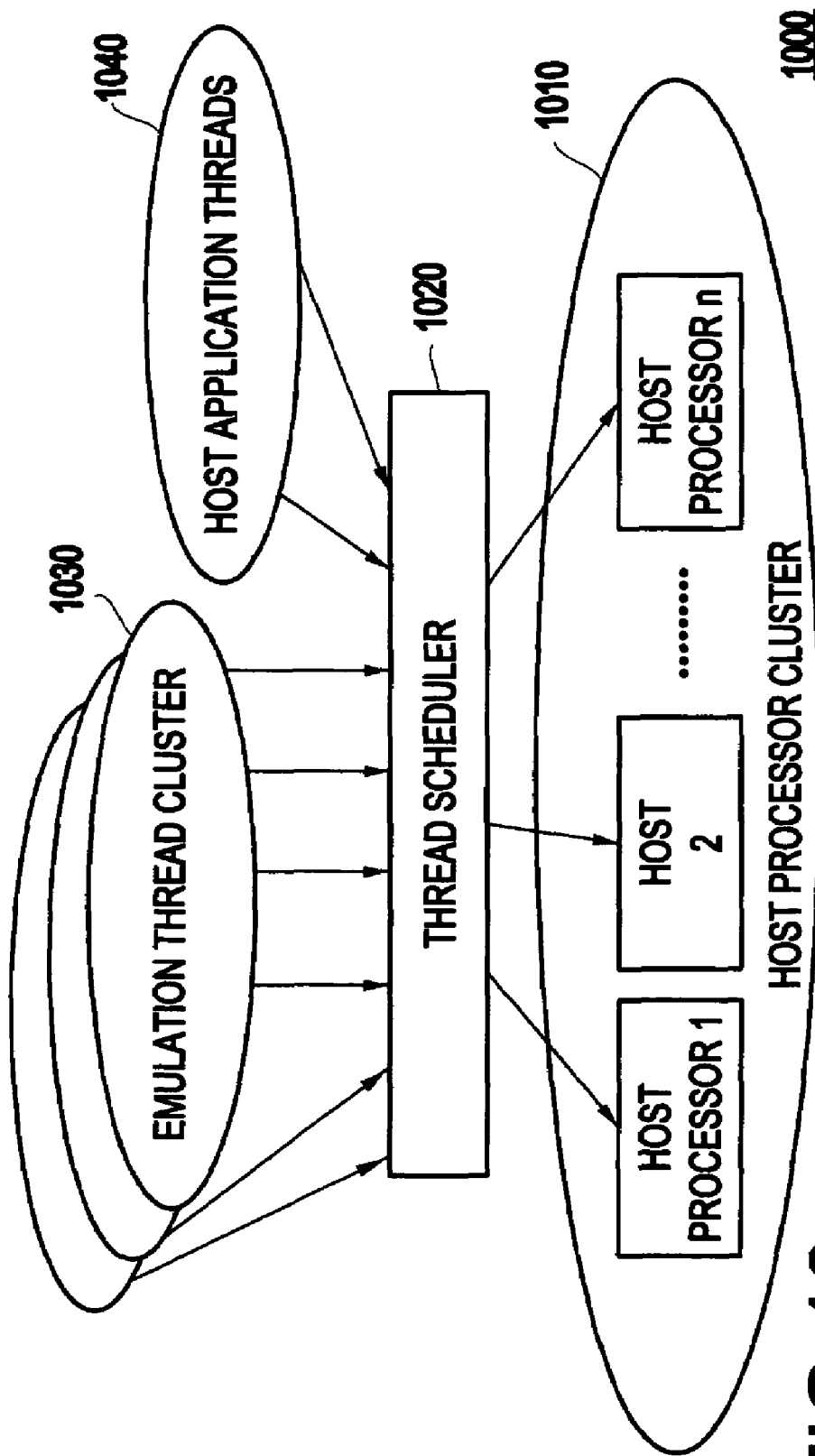
FIG. 10 shows a more general system 1000 which can be mapped onto a multiprocessing host system.

FIG. 10 shows how a more general system 1000 can be mapped (emulated) onto a multiprocessing host system. The system 1000 may include a host processor cluster 1010, a thread scheduler 1020, an emulation thread cluster(s) 1030, and host application threads 1040.

That is, the invention is useful not only with a multiprocessing host, but also with a host similar to the IBM 390® System as shown in FIG. 10, in which there is a cluster configuration having a plurality of distinct multiprocessors which communicate with each other. Thus, even such a system can be emulated on the type of multiprocessing host as described above.

Additionally, the inventive system is not restricted to only emulation. That is, the particular system is not restricted to performing just emulation, but for example, an application (e.g., Linux) can be running directly on the host, with the application not being under emulation but instead running native on the host. In such a case, the host application threads 1040 can be run on the host, and can be scheduled/managed by the thread scheduler 1020 (which would also manage the threads of the emulation thread cluster). Hence, the invention has great utility not only for emulation but also for applications running directly the host directly.

It is noted that the above mentioned article by Herrod directed to SimOS and U.S. Pat. No. 5,832,205 have indicated that the performance of an emulation system can be dramatically improved by caching as follows.

That is, if a group of instructions is expected to be executed several times, it is first translated from the target instruction set to the host instruction set, and the translations are saved in a special area of memory called the "translation cache". When the address of this group is encountered thereafter, the native host instructions are directly executed. By avoiding the refetch of the target instructions and retranslation of these instructions, the instruction group is executed considerably faster. Further benefit can be obtained by analyzing this group of instructions and optimizing the translation produced. Some examples of such optimization can be seen in U.S. Pat. No. 5,832,205, incorporated herein by reference.

The benefit obtained by caching translations depends both on the effort needed to translate the instruction group, as well as the number of times the translated group is eventually executed. Since the latter cannot be predicted for most types of code, heuristics are used to determine potential candidates for translation.

Figure 11:
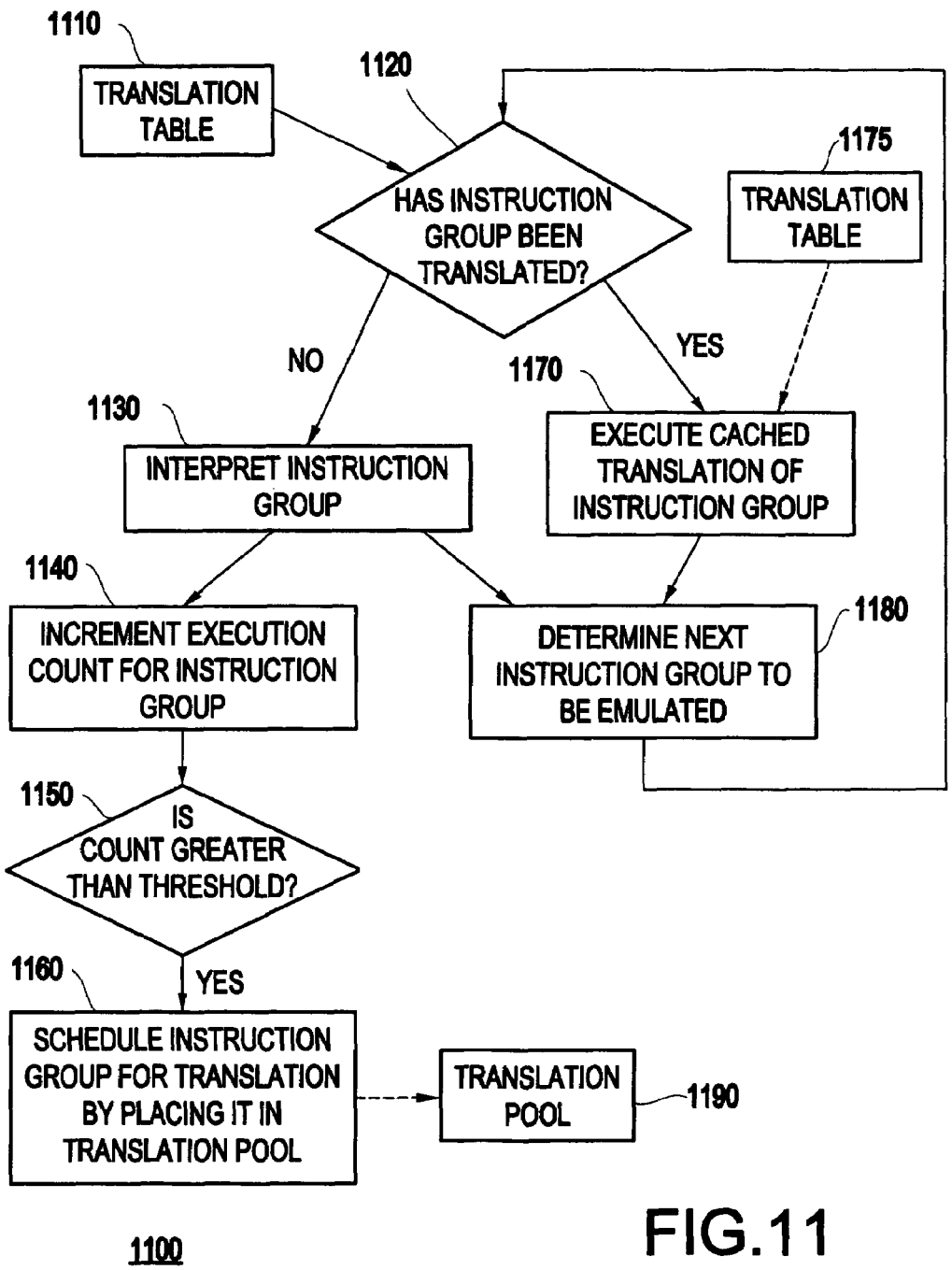
FIG. 11 shows an emulation scheme 1100 which caches translations for reuse.

FIG. 11 shows a method 1100 for performing the above operation, and one simple heuristic is to keep a count of past executions of a given group of instructions and to translate the group when the count has exceeded a preset threshold.

FIG. 11 shows a translation table 1110 indexed by the address of the group of instructions to be executed next.

In step 1120, if there is a valid entry in the translation table 1110 corresponding to this address, it points to a location from which the translated native instructions should be fetched and executed.

If there is no valid entry as determined in step 1120, then the target instructions are interpreted directly (step 1130) and a counter associated with the group is incremented (step 1140).

If this counter exceeds a threshold (step 1150), for example if the group has been interpreted 5 times already, then the group is scheduled for translation (step 1160).

If in step 1120, it is determined that the instruction has been translated (e.g., a "YES"), then the cached translation of the instruction group is executed in step 1170 by accessing the translation cache 1175.

Then, in step 1180, the next instruction group to be emulated is determined.

In a system as described in U.S. Pat. No. 5,832,205, the emulated thread would perform the translation either at the point it is discovered that the threshold condition is satisfied, or just before executing the group the next time. The time spent by the thread performing the translation could potentially have been used to start executing the next group of instructions and hence represents an overhead to the system.

A more efficient approach would be for the thread to simply put the instruction group into the translation pool (e.g., 1190) and continue with the execution of the next group. Thus, when a translation has been completed, the translated object is put in the translation cache with a pointer in the translation table 1110, as shown in FIG. 12 discussed below.

Figure 12:
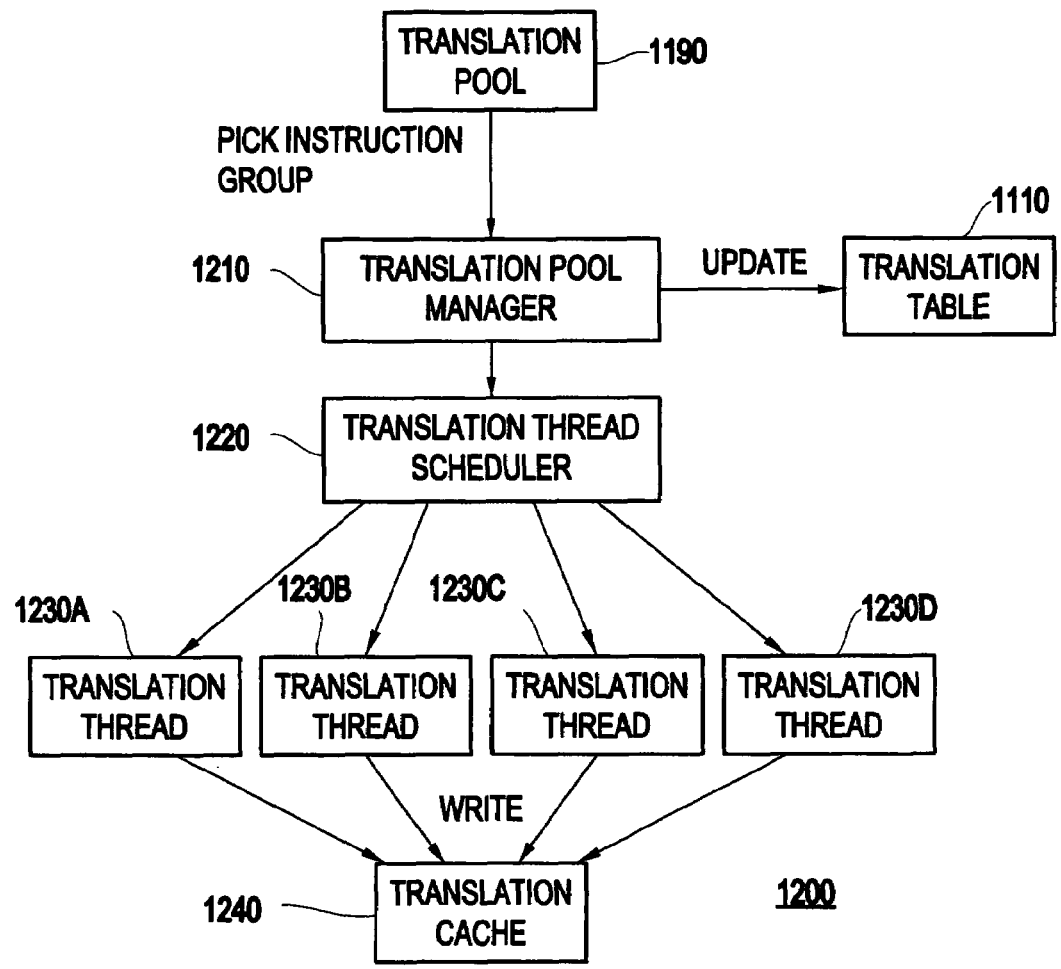
FIG. 12 shows a system 1200 for generation of parallel translation threads.

FIG. 12 shows a system 1200 for the generation of parallel translation threads.

In FIG. 12, another thread, called the translation pool manager (e.g., 1210 shown in FIG. 12), monitors the translation pool (1190 shown in FIG. 11) to pick instruction groups that need translation, independent of the execution of the processor thread. The translation pool manager 1210, further, need not perform the translations itself.

Since the process of translating one group of instructions is largely independent of the process of translating another group, the translation pool manager 1210 could spawn several threads, each of which performs translation of a group from the pool, as shown in FIG. 12.

In FIG. 12, the translation pool manager 1210 selects an instruction group for translation from the translation pool 1190. The translation pool manager 1210 updates the translation table 1110, and in turn provides the threads to the translation thread scheduler 1220. The thread scheduler schedules translation threads 1230A, 1230B, 1230C, 1230D, etc., and writes them to the translation cache 1240.

The effect of this system/operation is essentially to partition the tasks of emulation further into independent parallel threads that can be exploited even better by a host multiprocessing system. Thus, the system of FIG. 12 utilizes the translation feature and incorporates it therein, and maps it into the framework of the inventive system. Hence, this feature of caching the translation (and in fact performing the translation) enhances emulation (and the type of threads dealt with) by the inventive system.

FIG. 13 shows a system 1300 which includes a host processor cluster 1310, a thread scheduler 1320, and an emulation thread cluster 1330. FIG. 13 is a modified view of FIG. 9 with additional threads that could improve the performance and utilization of the host system. This benefit of additional threads carries over further to the multi-cluster mainframe emulation system of FIG. 10. Thus, while FIG. 13 exemplarily shows for clarity and brevity only one of the emulation thread clusters, a plurality of such emulation thread clusters can be provided as shown in FIG. 10, as well as the host application threads 1040 of FIG. 10.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by digital data processor(s), in a multiprocessor system to execute a sequence of machine-readable instructions. These instructions may reside in various types of signal-bearing media.

Thus, this aspect of the present invention is directed to a programmed product, including signal-bearing media tangibly embodying a program of machine-readable instructions executable by digital data processor(s) in a multiprocessing system incorporating a processor/central processing unit (CPU) and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette 1400 (FIG. 14), directly or indirectly accessible by the CPU.

Whether contained in the diskette 1400, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

It is noted that the invention has many benefits as discussed above including efficient emulation. Further, the invention could be used as a basis for performing "virtualization" which assists in load balancing. Virtualization can take various forms including load balancing. For example, virtualization can also be used for fault tolerance in which if one processor has failed in a system having a one-to-one mapping (or another mapping scheme), then the system can continue working since the failed system can be abstracted and there simply can be a smaller pool of host processors. Thus, another processor can take up the duties of the failed processor.

Another possible application for the invention is in power savings. That is, upon determination that too much power is being consumed in a multiprocessor system, then some processors could be shut down and yet the functionality of the entire emulation could be maintained at the lower power level. As such, the functions of the processor being shut down can be shifted to another processor. This is relatively simple to do by the invention since each processor is being treated as a thread, rather than as a one-to-one mapping of the threads to the processors.

That is, in the invention, the scheme is a many-to-many mapping, as opposed to the SimOS technique in the above-described Herrod article which is a many-to-one mapping, or to U.S. Pat. No. 5,832,205 which is a one-to-one mapping scheme.

Further, it is noted that, Applicant's intent is to encompass equivalents of all claim elements, even if amended later during prosecution.

What is claimed is:

1. A system for executing a program written for a target instruction set architecture on a host computing system having a plurality of processors designed to process instructions of a second instruction set architecture, said system comprising:
   a representation unit for representing each portion of the program designed to run on a processor of the target computing system as one or more program threads to be executed on the host computing system, based upon classifying an instruction for its affects on local and shared resources; and
   at least one memory, said at least one memory designated, as based on said instruction classifying, into different portions to be used for a processing of said program threads,
   wherein said program threads can be executed selectively on different ones of said plurality of processors of said host computing system.

2. A storage medium tangibly embodying a program of machine-readable instructions executable by a digital processing apparatus to perform a method of executing a program written for a target instruction set architecture on a host computing system having a plurality of processors designed to process instructions of a second instruction set architecture, said method comprising:
   representing each portion of the program designed to run on a processor of a target computing system as one or more program threads to be executed on the host computing system, based upon classifying an instruction for its affects on local and shared resources;
   designating, as based on said instruction classifying, different portions of a memory in said host computing system to be used for a processing of said program threads; and
   executing said program threads selectively on different ones of said plurality of processors of said host computing system.

* * * * *